US008091359B2

(12) United States Patent
Ulrey et al.

(10) Patent No.: US 8,091,359 B2
(45) Date of Patent: Jan. 10, 2012

(54) EXHAUST HEAT RECOVERY FOR ENGINE HEATING AND EXHAUST COOLING

(75) Inventors: Joseph Norman Ulrey, Dearborn, MI (US); Ross Dykstra Pursifull, Dearborn, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/793,447

(22) Filed: Jun. 3, 2010

(65) Prior Publication Data
US 2011/0138807 A1 Jun. 16, 2011

(51) Int. Cl.
F02B 33/44 (2006.01)
(52) U.S. Cl. .......................... 60/611; 60/605.1
(58) Field of Classification Search ............ 60/600–603, 60/611, 605.1; 123/563, 556–557
See application file for complete search history.

(56) References Cited

U.S. PATENT DOCUMENTS

| | | | | |
|---|---|---|---|---|
| 6,397,597 B1* | 6/2002 | Gartner | ................... | 60/605.2 |
| 6,675,579 B1* | 1/2004 | Yang | ..................... | 60/605.2 |
| 6,688,263 B1 | 2/2004 | Yamamoto et al. | ........ | 123/41.57 |
| 7,210,467 B2 | 5/2007 | Kweon et al. | ................ | 123/557 |
| 7,287,521 B2 | 10/2007 | Yang | ............................ | 123/556 |
| 7,322,192 B2* | 1/2008 | Sheidler et al. | ............ | 60/605.2 |
| 7,322,193 B2* | 1/2008 | Bering et al. | ............... | 60/605.2 |
| 7,874,154 B2* | 1/2011 | Raab et al. | ................... | 123/563 |
| 2009/0020260 A1 | 1/2009 | Miyagawa | .................... | 165/41 |
| 2010/0095939 A1* | 4/2010 | Geskes | ......................... | 123/556 |

FOREIGN PATENT DOCUMENTS

EP 0 626 514 A1 11/1994

OTHER PUBLICATIONS

Lippa, Allan J. et al., "Warming Intake Air Using EGR Cooler In Dual-Throttle Boosted Engine System," U.S. Appl. No. 12/684,337, filed Jan. 8, 2010, 41 pages.
Pursifull, Ross Dykstra et al., "Intake Air Heating and Exhaust Cooling," U.S. Appl. No. 12/793,074, filed Jun. 3, 2010, 27 pages.

* cited by examiner

*Primary Examiner* — Thai Ba Trieu
(74) *Attorney, Agent, or Firm* — Allan J. Lippa; Alleman Hall McCoy Russell & Tuttle LLP

(57) ABSTRACT

Various systems and method for heating an engine in a vehicle are described. In one example, intake air flowing in a first direction may be heated via a gas-to-gas heat exchange with exhaust gases. The heated intake air may then be used in a subsequent gas-to-liquid heat exchange to heat a fluid circulating through the engine. In another example, intake air flowing in a second direction may be heated via a heat exchange with exhaust gases in order to cool an exhaust catalyst.

16 Claims, 3 Drawing Sheets

EXHAUST HEAT RECOVERY FOR ENGINE HEATING AND EXHAUST COOLING

TECHNICAL FIELD

The present application relates to heat exchange and, more specifically, to using a heat exchanger for engine heating and exhaust cooling.

BACKGROUND AND SUMMARY

Under cold start conditions, an engine has cooled to ambient conditions, which may be relatively hot or cold, and each component of the engine warms-up to a desired operating temperature. During this time, emissions may be higher and there may be energy losses such as viscous energy losses due to a relatively cool temperature of fluids (e.g., engine oil, transmission fluid, etc.) circulating through the powertrain.

Some methods for expediting engine heating include exhaust heat recovery. In some examples, exhaust heat is transferred to engine coolant, for example, via a heat exchanger. Such a method, however, may be only marginally effective in quickly heating the combustion chamber and/or reducing fluid viscosity.

The inventors herein have recognized the above problems and have devised an approach to at least partially address them. Thus, a method for heating an engine in a vehicle is disclosed. The method comprises heating intake air via a gas-to-gas heat exchanger, the gas-to-gas heat exchanger in communication with exhaust gases, and heating a fluid which flows through the engine with the intake air via a gas-to-liquid heat exchanger.

By heating intake air with exhaust heat and then transferring some of the heat to a powertrain fluid such as engine oil, the fluid may be heated thereby reducing energy losses due to the viscosity of the fluid in addition to reducing combustion chamber heat loss. Further, the heated intake air may be cooled via the heat exchange with the powertrain fluid, yet still be warmer than ambient air such that engine pumping losses may also be reduced, but not so hot that combustion stability is reduced or knock instigated. Further, during warmed-up or boosted operating conditions, for example, heated intake air may cause knock under some conditions; however, during a cold start with the engine warming up, the possibility of the heated intake air causing knock is decreased. As such, a synergistic operation may be achieved.

Another advantage of the disclosed approach is the warming of the engine coolant with air that has picked up heat from the exhaust can increase the heat available for cabin warming. Further, engines often have oil coolers to mitigate peak oil temperatures for engine used at extreme conditions. Thus, the disclosed approach uses the air-to-oil (e.g., gas-to-liquid) heat exchange to achieve oil cooling by reversing the airflow direction via the increased boost, which occurs precisely at times when engine oil cooling needs arise.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for heating an engine in a vehicle during a cold start. In one example, intake air flowing in a first direction may be heated through a heat exchange with exhaust gas via a gas-to-gas heat exchanger. The heated intake air may subsequently undergo a second heat exchange with a powertrain fluid (e.g., engine oil, transmission fluid, etc.) via a gas-to-liquid heat exchanger such that the powertrain fluid is heated. As such, viscous energy losses due to relatively cold fluid may be reduced, and combustion chamber heat loss and pumping losses are also reduced due to the heated intake air. Furthermore, in another example, when pumping loss reduction and powertrain fluid heating are not desired, but exhaust cooling is desired, intake air may flow through the heat exchangers in a second direction such that the exhaust is cooled for exhaust catalyst cooling, for example.

Figure 1:
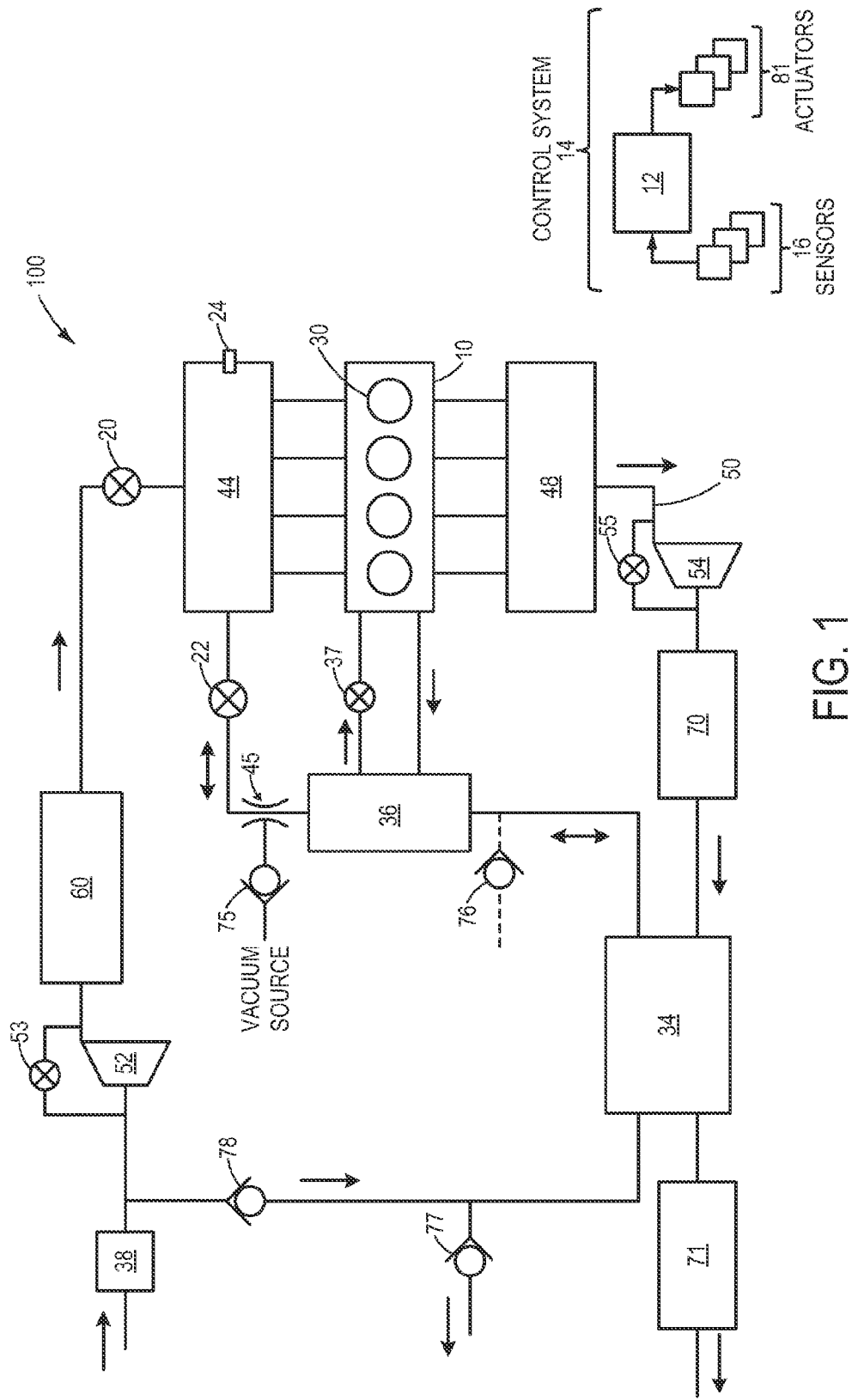
FIG. 1 shows a block diagram of an engine including a gas-to-gas heat exchanger and a gas-to-liquid heat exchanger.

FIG. 1 shows a schematic diagram of vehicle system 100. Vehicle system 100 includes engine 10 which may be included in a propulsion system of an automobile, engine 10 having a plurality of cylinders 30. Engine 10 may be controlled at least partially by a control system 14 including controller 12 and by input from a vehicle operator via an input device (not shown in FIGS. 1 and 2). Vehicle system 100 includes exhaust manifold 48 leading to exhaust passage 50 which eventually leads to a tailpipe (not shown in FIG. 1) that eventually routes exhaust gas to the atmosphere. As described in more detail below, exhaust passage 50 of vehicle system 100 may include one or more emission control devices.

Vehicle system 100 further includes control system 14. Control system 14 is shown receiving information from a plurality of sensors 16 (various examples of which are described herein) and sending control signals to a plurality of actuators 81 (various examples of which are described herein). As one example, sensors 16 may include manifold air pressure (MAP) sensor 24 located in intake manifold 44. Additionally, other sensors such as temperature, air-fuel ratio, and composition sensors may be coupled to various locations in vehicle system 100. As another example, the actuators may include actuators for fuel injectors (not shown), throttle 20, air bypass valve 22, and other control valves that are not shown in FIG. 1. As shown in FIG. 1, air bypass valve 22 provides a source of warm, non-dilute air to engine 10. Throttle 20 provides a source of cool air to engine 10 which may be diluted with EGR, for example. Further, air bypass valve 22 can be used to transiently provide non-dilute air if EGR is metered upstream of this point.

Vehicle system 100 further includes charge air cooler (CAC) 60. CAC 60 is arranged along the intake passage upstream of throttle 20 for cooling the engine intake air after it has passed through the turbocharger and/or if it is diluted with EGR, for example. Further, air filter 38 is shown arranged along the intake passage upstream of CAC 60. For example, air filter 38 may remove particulates from the intake air.

Control system 14 includes controller 12. Controller 12 may be a microcomputer including the following, although not shown in FIG. 1: a microprocessor unit, input/output ports, an electronic storage medium for executable programs and calibration values (e.g., a read only memory chip), random access memory, keep alive memory, and a data bus.

Storage medium read-only memory may be programmed with computer readable data representing instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example routines are described herein with reference to FIGS. 2 and 3.

Engine 10 may further include a compression device such as a turbocharger or supercharger including at least a compressor 52 arranged along an intake passage. For a turbocharger, compressor 52 may be at least partially driven by turbine 54 via a shaft (not shown) arranged along the exhaust passage. For a supercharger, compressor 52 may be at least partially driven by the engine and/or an electric machine, and may not include a turbine. Thus, the amount of compression provided to one or more cylinders of the engine via a turbocharger or supercharger may be varied by controller 12. Further, vehicle system 100 includes compressor bypass valve (CBV) 53 to release pressure in the intake system when the engine is boosted. In some embodiments (not shown), air flowing in a first direction through air bypass valve 22 may join the intake passage upstream of throttle 20. In such an embodiment, air bypass valve 22 may also be used as a compressor bypass valve. Wastegate 55 is provided to divert exhaust gases to regulate the speed of turbine 54, for example.

Engine 10 is shown coupled to exhaust passage 50 upstream of emission control devices 70 and 71 in FIG. 1. As an example, emission control devices 70 and 71 may be a three way catalyst (TWC), $NO_x$ trap, particulate filter, selective catalyst reduction (SCR) system, various other emission control devices, or combinations thereof. In some embodiments, during operation of engine 10, emission control devices 70 and/or 71 may be periodically reset by operating at least one cylinder of the engine within a particular air/fuel ratio.

Further, as shown in the example embodiment of FIG. 1, vehicle system 100 further includes heat exchangers 34 and 36. Heat exchanger 34 may be a gas-to-gas heat exchanger for heating intake air and cooling exhaust gas. Heat exchanger 36 may be a gas-to-liquid heat exchanger for exchanging heat between intake air and a fluid circulating through the powertrain such as engine oil, transmission fluid, coolant, etc. The liquid flow through heat exchanger 36 may optionally be shut off via valve 37 to get very hot air to the intake manifold, if desired. In some embodiments, the exhaust heat can be removed at any point along the exhaust conduit, even as far upstream as to cool the exhaust port or exhaust manifold. For example, heat exchanger 34 may be positioned at various locations along the exhaust conduit, not just between emission control devices 70 and 71 as shown in FIG. 1. As an example, heat exchanger 34 may be positioned upstream of emission control device 70.

In the example embodiment of FIG. 1, intake air may flow in a first direction through air bypass valve 22. During periods when air bypass valve 22 is open and the engine is not boosted (as will be described in further detail below), intake air may be drawn through air bypass valve 22 such that it first flows through heat exchanger 34. As such, intake air flowing through heat exchanger 34 is heated while the exhaust gas flowing through heat exchanger 34 is cooled. Heated intake air may be desired, for example, to reduce pumping losses at part load. Heated intake air leaving heat exchanger 34 then enters heat exchanger 36 where heat exchange occurs between the intake air and a powertrain fluid. During a cold engine start, for example, heat from the heated intake air is transferred to the powertrain fluid and the temperature of the fluid increases, which may be desired to reduce viscous friction losses. Further, the temperature of the heated intake air that is delivered to the engine is reduced during the heat exchange resulting in an air temperature that is not too hot for engine intake use, for example. Vehicle system 100 may also include check valve 76 (depicted along a dashed line in FIG. 1) upstream of heat exchanger 36 in order to vent some of the hot air when less heating of the powertrain fluid is desired or if less cooling of the exhaust catalyst is desired during powertrain fluid cooling, for example.

Further, in the example embodiment of FIG. 1, intake air may flow in a second direction through air bypass valve 22. During periods when the engine is boosted (e.g., the turbocharger is in operation and manifold air pressure is greater than barometric pressure), some excess intake air may flow through air bypass valve 22 to heat exchanger 36. As such, some cooling of the powertrain fluid occurs. In some embodiments, the powertrain fluid system may have a valve (e.g., valve 37) that, when closed, can cease flow of the fluid through heat exchanger 36, if desired. In such an embodiment, no heat exchange takes place when the excess intake air passes through the heat exchanger 36. After flowing through heat exchanger 36, the excess intake air passes through heat exchanger 34. As such, exhaust gas passing through heat exchanger 34 is cooled which may facilitate catalyst cooling. Further, in such an embodiment, the intake air is heated as it passes through heat exchanger 34. As such, vehicle system 100 includes check valve 78 to prevent the hot intake air from re-entering the intake passage. Vehicle system 100 further includes check valve 77 to allow the hot air to be vented to the atmosphere.

As illustrated in the embodiment of FIG. 1, vehicle system 100 further includes venturi 45 coupled to check valve 75. The flow of air in either direction through venturi 45 may be used a vacuum source. As an example, the vacuum generated via venturi 45 may be used for the brake system (not shown).

Figure 2:
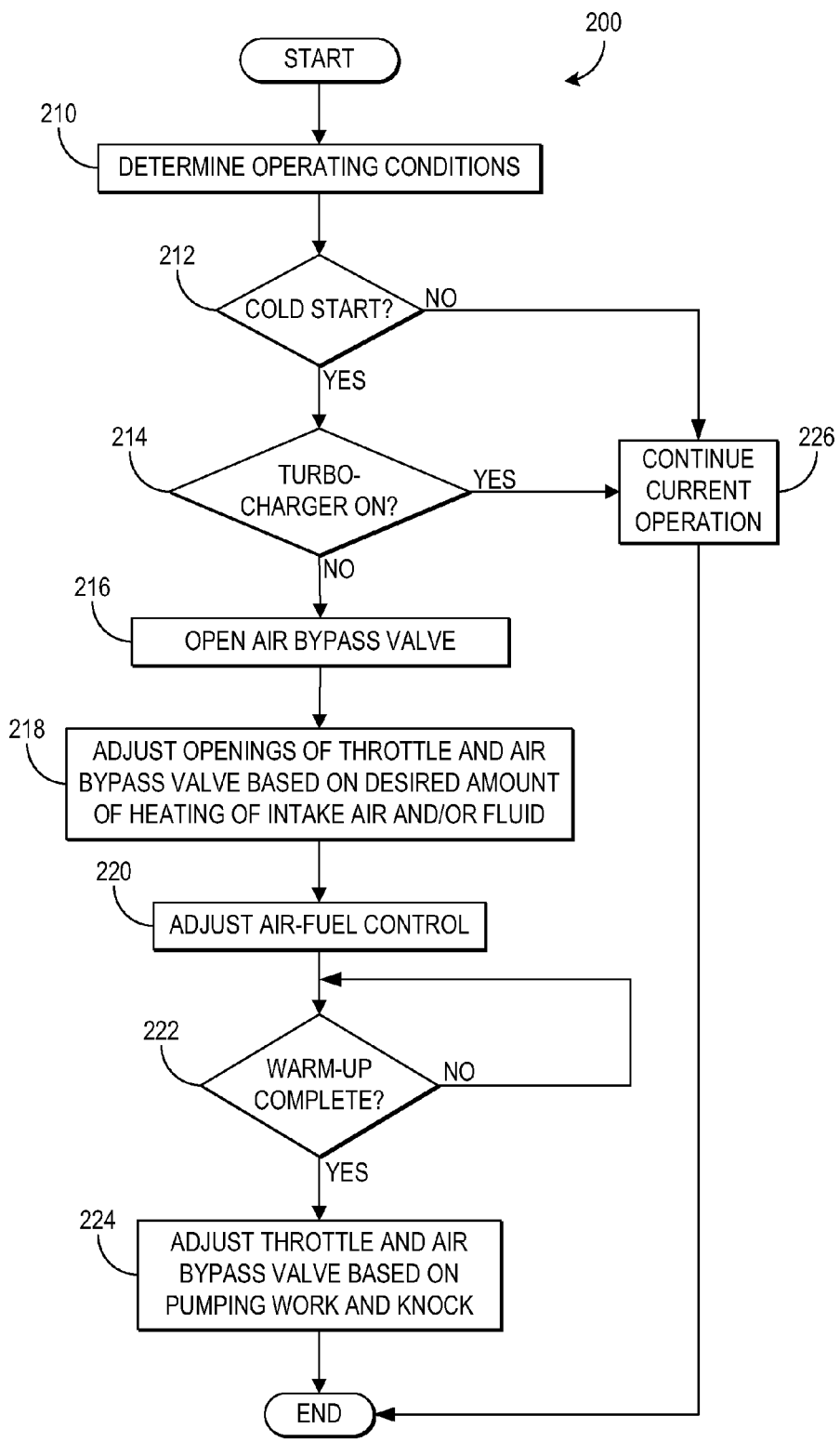
FIG. 2 shows a flow chart illustrating a routine for heating an engine.
Figure 3:
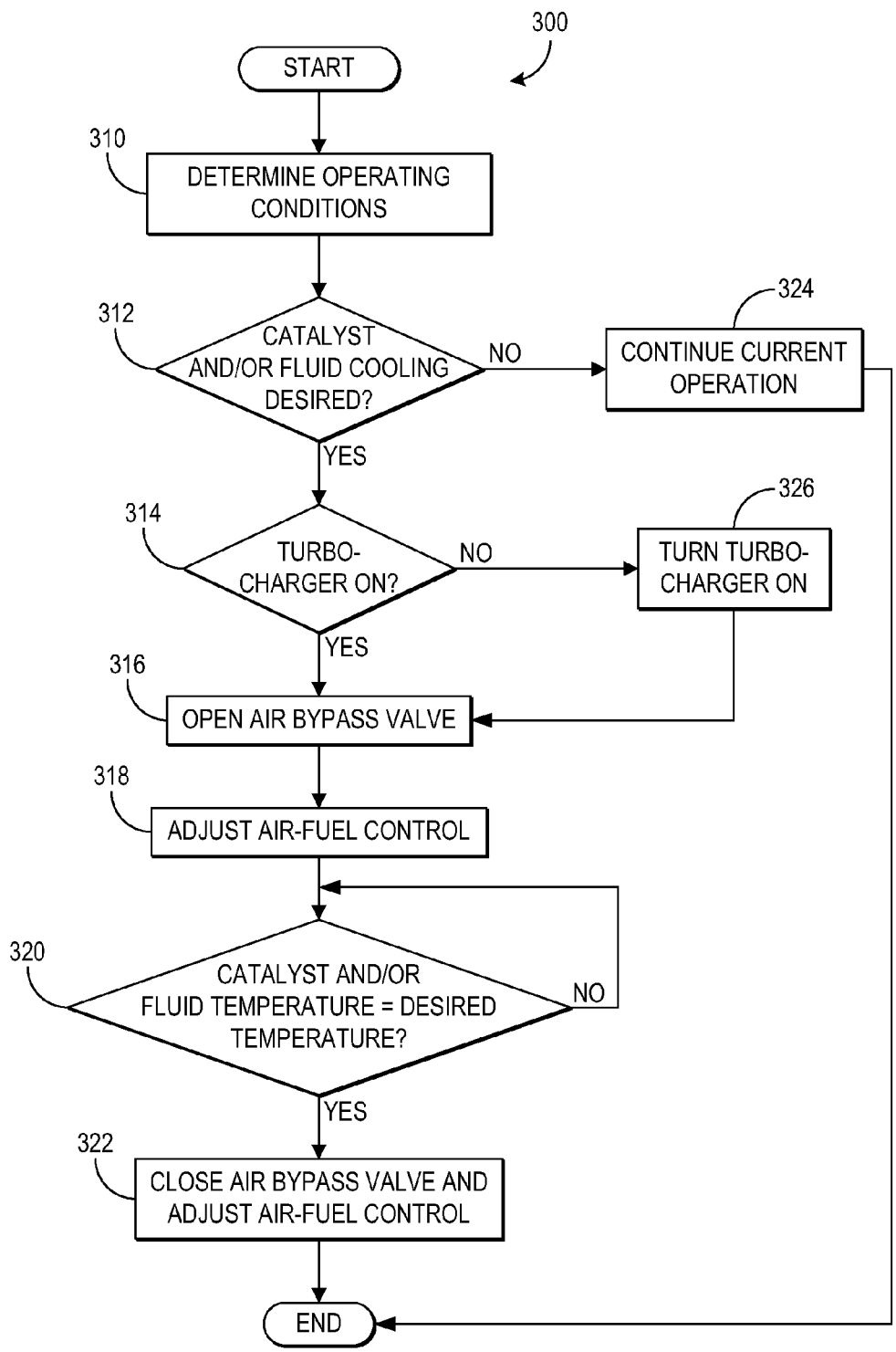
FIG. 3 shows a flow chart illustrating a routine for cooling an exhaust catalyst and/or powertrain fluid.

The flow charts in FIGS. 2 and 3 illustrate control routines for controlling airflow through an air bypass valve, such as air bypass valve 22 described above, in the directions depicted in FIG. 1 and may be used together and carried out in a coordinated way.

FIG. 2 shows a flow chart illustrating a control routine 200 for heating an engine in a vehicle, such as engine 10 described above with reference to FIG. 1. Specifically, routine 200 determines engine operating conditions and opens the air bypass valve to allow intake air to flow through in a first direction based on the operating conditions.

At 210 of routine 200, engine operating conditions are determined. Engine operating conditions may include engine temperature, boost level, powertrain fluid temperature, etc.

Once the engine operating conditions are determined, routine 200 proceeds to 212 where it is determined if the engine is under a cold start. As referred to herein, "cold start" implies the engine is started under conditions in which the engine has cooled to ambient conditions, which may be relatively hot or cold. If the engine is not under cold start conditions, routine 200 moves to 226 where current engine operation is continued and the routine ends. For example, the current engine operation may include operating with the air bypass valve closed and air-fuel control not accounting for variation in intake charge due to either direction of airflow in the air bypass valve.

On the other hand, if it is determined that the engine is under cold start conditions, routine 200 continues to 214 where it is determined if the turbocharger is on. In some embodiments, for example, the turbocharger may have a bypass valve (e.g., a wastegate) that directs flow around the turbine such that the intake air is not boosted. As such, the valve may be positioned such that a minimum level of exhaust gas flows through the turbine when boosted intake air is not desired. If it is determined that the turbocharger is on and intake air is boosted above a threshold level (e.g., if boost pressure (intake manifold pressure) is greater than atmospheric pressure), routine 200 moves to 226 where current engine operation is continued and the routine ends.

If it is determined that the turbocharger is not in operation (e.g., the wastegate is open), routine 200 of FIG. 2 proceeds to 216 where the air bypass valve is opened. The air bypass valve may be a butterfly valve, for example, that can be adjusted to regulate the flow of intake air through the valve. The opening of the valve may be based on various operating parameters, and once the air bypass valve is open, routine 200 continues to 218 where the openings of the air bypass valve and throttle are adjusted based on a desired amount of heating of the intake air and/or powertrain fluid, such as engine oil. For example, the throttle may be completely closed such that only heated intake air enters the engine. As another example, the air bypass valve may be completely opened such that a maximum amount of intake air is drawn through the gas-to-liquid heat exchanger for heating a powertrain fluid and the throttle may be partially open to allow cooler air to enter the cylinders of the engine. Further, the amount of bypass air flowing may be adjusted responsive to engine coolant temperature in an inverse proportion.

Further, in some embodiments, an amount of powertrain fluid flowing through the gas-to-liquid heat exchanger may be adjusted via a valve in the powertrain fluid system, for example, such that a desired amount of intake air heating is achieved. For example, increased fluid flow may be provided when bypass air temperature is high, to increase fluid heating and moderate bypass air temperature to prevent damage to intake manifold, fuel injectors, etc.

After the openings of the throttle and air bypass valve are adjusted, routine 200 continues to 220 where air-fuel ratio control is adjusted. For example, varying amounts of air entering the intake manifold through the throttle and the air bypass valve can change the pressure detected by the MAP sensor as well as an amount of air entering the cylinders of the engine, for example. As such, fuel injection may be adjusted in an open loop manner from the MAP sensor, based on a direction of bypass flow, and an amount of bypass flow, to maintain a desired air-fuel ratio, for example. In one example, when bypass flow is present, and open loop fuel injection adjustment is provided increasing open loop fuel injection when bypass flow enters the intake manifold, decreasing open loop fuel injection when bypass flow exits the intake manifold, and no additional open loop fuel injection adjustment with there is no bypass flow At 222 of routine 200, it is determined if conditions are met for completion of powertrain warm-up. Conditions for completion of powertrain warm-up may include engine temperature greater than a threshold temperature, fluid temperature greater than a threshold temperature, time since start, etc. If one or more of the conditions for powertrain warm-up are not met, routine 200 continues until the conditions are met.

Once the conditions for completion of powertrain warm-up are met, routine 200 continues to 224 where the throttle and the air bypass valve are adjusted to optimize engine efficiency based on pumping work and knock. For example, if the increased temperature of intake air begins to cause knock in one or more engine cylinders, the bypass valve may be partially or fully closed so that the temperature in the cylinders is decreased and knock is reduced. If the temperature of the intake air exceeds a threshold temperature (e.g., a maximum temperature), the air bypass valve may be partially or fully closed (and the throttle opening may be increased) to prevent damage to fuel injectors, intake manifold, etc. If the pressure of the intake manifold exceeds a threshold pressure (e.g., 90 kPa), the air bypass valve may be partially or fully closed (and the throttle opening may be increased) to ensure that the engine can produce the desired torque without boosting. If none of these conditions is met, the air bypass may be partially or fully opened (and the throttle opening may be decreased) to increase intake air temperature, reduce intake air density, reduce engine pumping losses, and improve engine efficiency.

Thus, the air bypass valve may be controlled to allow intake air to flow through a series of heat exchangers in order to heat engine intake air as well as a powertrain fluid. In this manner, fuel economy may be increased as intake stroke pumping work is decreased due to the increased intake charge temperature. Further, heating of powertrain fluid circulating through the engine such as oil or transmission fluid to a desired temperature for warmed-up engine operation may be expedited thereby reducing viscous energy losses due to friction.

Continuing to FIG. 3, which may be used in combination with FIG. 2, a flow chart illustrating a control routine 300 for cooling an exhaust catalyst, such as exhaust catalyst 71 described above with reference to FIG. 1, and/or cooling powertrain fluid is shown. Specifically, routine 300 determines engine operating conditions and opens the air bypass valve to allow intake air to flow through in a second direction (e.g., the reverse of the first direction) based on the operating conditions.

At 310 of routine 300, engine operating conditions are determined. As described above, engine operating conditions may include exhaust catalyst temperature, manifold air pressure, boost level, etc.

Once the engine operating conditions are determined, routine 300 proceeds to 312 where it is determined if catalyst and/or fluid cooling are desired. For example, the catalyst may be a particulate filter that is periodically regenerated at high temperature, and it may be indicated that catalyst cooling is desired after particulate filter regeneration or if the catalyst temperature increases above a threshold temperature during regeneration, for example. As another example, during conditions in which the engine is boosted, the powertrain fluid temperature may increase above a desired temperature and fluid cooling may be desired.

If it is determined that catalyst and/or fluid cooling is not desired, routine 300 moves to 324 where current engine operation is continued and the routine ends. On the other hand, if it is determined that catalyst and/or fluid cooling is desired, routine 300 continues to 314 where is it determined if the turbocharger is on (e.g., the engine is boosted). If it is determined that the engine is not boosted, routine 300 moves to 326 where the turbocharger is turned on in order to boost the engine.

If it is determined that the turbocharger is on (e.g., boost pressure is greater than a threshold value) at 314 or once the turbocharger is turned on (e.g., the wastegate is at least partially closed) at 326, routine 300 proceeds to 316 where the air bypass valve is opened. In some embodiments, for example, the air bypass valve may be opened once the air pressure in the intake manifold (MAP) increases above the barometric pressure.

As described above, the opening of the air bypass valve may be adjustable such that the flow of intake air through the air bypass valve may be regulated. Further, openings of the throttle and air bypass valve may be adjusted in order to achieve a desired amount of flow through the gas-to-gas heat exchanger.

Further, if powertrain fluid cooling is desired, a valve (e.g., valve 37 described above with reference to FIG. 1) may be opened to allow fluid to flow through the gas-to-liquid heat exchanger. On the other hand, if powertrain fluid cooling is not desired, the valve may be closed such that heat from the fluid is not lost to the intake air during catalyst cooling.

Once the air bypass valve is opened at 316, routine 300 proceeds to 318 and air-fuel ratio control is adjusted. In this example, a varying amount of air leaves the intake manifold through the air bypass valve. As such, open loop feedback based on the MAP sensor, for example, may indicate a smaller amount of fuel injection in order to maintain a desired air-fuel ratio, as discussed herein.

At 320 of routine 300, it is determined if the exhaust catalyst and/or the powetrain fluid has reached the desired temperature. The temperature may be measured by a temperature sensor coupled to the catalyst or within the powertrain fluid circuit, for example. In some examples, the desired temperature may be a warmed-up operating temperature of the catalyst. In other examples, the desired temperature may be a temperature of the catalyst required for regeneration.

If the catalyst has not reached the desired temperature, routine 300 returns to 320 until the catalyst has reached the desired temperature. Once it is determined at 320 that the desired temperature has been reached, routine 300 continues to 322 where the air bypass valve is closed and air-fuel ratio control is adjusted. As such, intake air no longer flows through the series of heat exchangers. Further, when the air bypass valve is closed, air enters the intake manifold only through the throttle and air no longer leaves the intake manifold through the air bypass valve. Thus, fuel injection may be adjust based on open loop feedback from the MAP sensor, for example.

Thus, the air bypass valve may be controlled to allow intake air to flow through a series of heat exchangers in order to cool exhaust gas and an exhaust catalyst, and/or powertrain fluid. In this manner, cooling of exhaust gas and the exhaust catalyst with fuel enrichment may be reduced, for example.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A heating method for a vehicle engine, comprising:
heating intake air via a gas-to-gas heat exchanger in communication with exhaust gases;
heating a fluid flowing through the engine with the intake air via a gas-to-liquid heat exchanger, the engine having a turbocharger and the gas-to-gas heat exchanger positioned upstream of an exhaust catalyst; and
cooling the exhaust catalyst when the turbocharger is in operation and boost is greater than a threshold value.

2. The method of claim 1, wherein the fluid is at least one of engine oil, engine coolant, or transmission oil.

3. The method of claim 1, wherein an amount of heated intake air is adjusted via an air bypass valve.

4. The method of claim 1, further comprising heating the intake air and the fluid during a cold engine start.

5. The method of claim 1, further comprising heating the intake air during warmed-up operation.

6. A method for a turbocharged engine in a vehicle, the engine having an exhaust catalyst, comprising:
heating intake air via a gas-to-gas heat exchanger, the gas-to-gas heat exchanger in communication with exhaust gases and positioned upstream of an exhaust catalyst;
passing the heated intake air through a gas-to-liquid heat exchanger to heat a fluid that flows through the engine and to reduce a temperature of the heated intake air;
delivering the heated intake air to a cylinder of the engine via an air bypass valve; and
cooling at least one of engine oil and the exhaust catalyst when the turbocharger is in operation and boost is greater than a threshold value.

7. The method of claim 6, wherein the fluid is at least one of engine oil, engine coolant, or transmission oil.

8. The method of claim 6, wherein the method is carried out under cold start conditions when the turbocharger is not in operation.

9. The method of claim 6, wherein an amount of heated intake air delivered to the engine is adjusted via the air bypass valve.

10. A heating system for an engine, comprising:
a throttle in an intake passage of the engine;
an air bypass valve;
a turbocharger;
an exhaust catalyst;
a gas-to-gas heat exchanger in communication with exhaust gases and intake air;
a gas-to-liquid heat exchanger in communication with intake air and a fluid circulating through the engine; and a control system comprising a non-transitory computer readable storage medium, the storage medium comprising instructions for:
  during a first operating condition, adjusting openings of the throttle and air bypass valve such that intake air flows in a first direction through the gas-to-gas heat exchanger and then the gas-to-liquid heat exchanger and heated air enters a cylinder of the engine;
  during a second operating condition, adjusting the openings of the throttle and air bypass valve such that intake air flows in a second direction through the air bypass valve, the second direction being the reverse of that during the first operating condition, and the exhaust catalyst is cooled; and
  during a third operating condition, closing the air bypass valve.

11. The heating system of claim 10, wherein the first operating condition includes cold engine start while the turbocharger is not in operation.

12. The heating system of claim 10, wherein the exhaust catalyst is positioned upstream of the gas-to-gas heat exchanger, and the second operating condition includes boost greater than a threshold value when the turbocharger is in operation.

13. The heating system of claim 10, wherein the third operating condition includes fluid temperature greater than a threshold temperature.

14. The heating system of claim 10, wherein the third operating condition includes fluid temperature less than a threshold temperature when the engine is boosted.

15. The heating system of claim 10, wherein the third operating condition includes time since start.

16. The heating system of claim 10, further comprising instructions for adjusting air-fuel control based on an operating condition of the engine.

* * * * *